United States Patent
Campbell

(10) Patent No.: US 11,215,583 B2
(45) Date of Patent: Jan. 4, 2022

(54) METHODS FOR DETECTION OF SAMPLE ENANTIOMERS USING DIFFERENTIAL MOBILITY SPECTROMETRY

(71) Applicant: DH TECHNOLOGIES DEVELOPMENT PTE. LTD., Singapore (SG)

(72) Inventor: John Lawrence Campbell, Concord (CA)

(73) Assignee: DH Technologies Development Pte. Ltd., Singapore (SG)

(*) Notice: Subject to any disclaimer, the term of this patent is extended or adjusted under 35 U.S.C. 154(b) by 345 days.

(21) Appl. No.: 16/093,681

(22) PCT Filed: Apr. 12, 2017

(86) PCT No.: PCT/IB2017/052117
§ 371 (c)(1),
(2) Date: Oct. 15, 2018

(87) PCT Pub. No.: WO2017/178988
PCT Pub. Date: Oct. 19, 2017

(65) Prior Publication Data
US 2019/0137447 A1    May 9, 2019

Related U.S. Application Data

(60) Provisional application No. 62/323,191, filed on Apr. 15, 2016.

(51) Int. Cl.
| | |
|---|---|
| *G01N 27/00* | (2006.01) |
| *G01N 27/624* | (2021.01) |
| *G01N 27/62* | (2021.01) |
| *C07B 63/00* | (2006.01) |
| *H01J 49/04* | (2006.01) |
| *H01J 49/10* | (2006.01) |

(52) U.S. Cl.
CPC .......... *G01N 27/624* (2013.01); *C07B 63/00* (2013.01); *G01N 27/62* (2013.01); *H01J 49/04* (2013.01); *H01J 49/10* (2013.01)

(58) Field of Classification Search
CPC ...... G01N 27/624; G01N 27/62; C07B 63/00; H01J 49/04; H01J 49/10
See application file for complete search history.

(56) References Cited

U.S. PATENT DOCUMENTS

| 6,461,858 B1 | 10/2002 | Gabriel et al. |
| 2009/0229352 A1 | 9/2009 | Kunz et al. |
| 2011/0045598 A1 | 2/2011 | Busch et al. |
| 2015/0069227 A1* | 3/2015 | Wu ...................... G01N 27/622 250/282 |

FOREIGN PATENT DOCUMENTS

| EP | 1750119 A1 | 2/2007 |
| WO | 2016030860 A1 | 3/2017 |

OTHER PUBLICATIONS

Licea-Perez, Hermes et al. "Camphanic acid chloride: a powerful derivatization reagent for stereoisomeric separation and its DMPK applications." Bioanalysis (2015) 7. (Year: 2015).*
Mie, Axel et al. "Enantiomer separation of amino acids by complexation with chiral reference compounds and high-field asymmetric waveform ion mobility spectrometry: preliminary results and possible limitations." Analytical Chemistry (2007) 79 2850-2858. (Year: 2007).*
Tai, Sherlock et al. "Chiral and stable isotope analysis of synthetic cathinones." Trends in Analytical Chemistry (2017) 86 251-262 (available online 2016). (Year: 2016).*
International Search Report and Written Opinion for PCT/IB2017/052117 dated Apr. 12, 2017.

* cited by examiner

*Primary Examiner* — Christopher Adam Hixson

(57) ABSTRACT

Methods and systems for separating, detecting, and/or quantifying sample enantiomers using differential mobility spectrometry (DMS) are provided herein. In accordance with various aspects of the applicant's teachings, the methods and systems can provide for the separation of racemic or non-racemic mixtures of sample enantiomers that may be difficult to separate with conventional techniques, such as mass spectrometry (MS), by reacting the sample enantiomers with an enantiomerically-pure compound to form diastereomers separable by DMS.

18 Claims, 11 Drawing Sheets

Camphanic chloride

N-(trifluoroacetyl)-prolyl chloride (A) Mixture of S,S- and R,S-TP Amphetamine (555 ng/mL) – From Racemic Amphetamine
(B) R,S-TP Amphetamine (555 ng/mL) – From Pure R-Amphetamine (A) Mixture of S,S- and R,S-TP Amphetamine (555 ng/mL) – From Racemic Amphetamine
(B) R,S-TP Amphetamine (555 ng/mL) – From Pure R-Amphetamine (A) Mixture of S,S- and R,S-TP Methamphetamine (555 ng/mL) – From Racemic methamphetamine (A) Mixture of S,S- and R,S-TPC Methamphetamine (555 ng/mL) – From Racemic Methamphetamine EPI of m/z 343          CoV = +9.1V EPI of m/z 343          CoV = +7.0V (A) Mixture of R,S,R- and S,S,R-Camphanyl-Warfarin (70 ug/mL)
(B) R,S,R-Camphanyl-Warfarin (50 ug/mL) – From Pure R-Warfarin (A) Mixture R,S,R- and S,S,R-Camphanyl-Warfarin (70 ug/mL)
(B) R,S,R-Camphanyl-Warfarin (50 ug/mL) – From Pure R-Warfarin

METHODS FOR DETECTION OF SAMPLE ENANTIOMERS USING DIFFERENTIAL MOBILITY SPECTROMETRY

RELATED US APPLICATIONS

This application claims the benefit of priority from U.S. Provisional Application Ser. No. 62/323,191, filed on Apr. 15, 2016, the entire content of which is hereby incorporated by reference.

FIELD

The present teachings generally relate to methods and systems utilizing differential mobility spectrometry (DMS) to identify, quantify, separate, and/or detect individual enantiomers.

BACKGROUND

Separating and detecting individual enantiomeric isomers (also referred to herein as enantiomers) of an enantiomeric pair has been an ongoing challenge in analytical chemistry. Enantiomers are identical to one another in chemical composition, but differ with respect to the spatial arrangement of the functional groups around one or more chiral centers such that the enantiomers are non-superimposable mirror images of one another. Though many enantiomers of an enantiomeric isomer pair exhibit identical physical and chemical properties (except for their differential rotation of polarized light), some enantiomers can exhibit different chemical reactivities from its alternate form in certain environments. By way of example, some enantiomers can exhibit markedly different pharmacological efficacies relative to its alternate enantiomeric form. Accordingly, it may be desirable to identify quickly and reliably which enantiomer of an enantiomeric pair is present within a sample and/or determine the enantiomers' relative quantity therein. However, conventional methods of separation may be inadequate to resolve enantiomers of an enantiomeric pair due to their aforementioned chemical and physical similarities. By way of example, conventional mass spectrometry techniques may be unable to resolve enantiomers due to their identical mass-to-charge ratios.

Conventional approaches for analyzing enantiomers in a sample using ion mobility spectrometry also suffer from a number of shortcomings. For example, in one such method, the complexation of enantiomers with metal ions and amino acids to form DMS-separable clusters suffers from poor sensitivity as a relatively large quantity of analyte is required to form the clusters. Further, the clusters can be fragile and cannot be heated to high temperatures in the ion source, and typically represent only about 1% of the total ion current produced by the analytical mixture. The depletion of enantiomeric ions through the application of circularly polarized laser light has also been attempted, but this process has proven inefficient. Chiral chemical modifiers have been also added to the drift gas of a conventional ion mobility spectrometer (IMS), but these results have not been reproduced elsewhere.

Accordingly, there remains a need for improved methods and systems for the separation and detection of enantiomeric isomers.

SUMMARY

Described herein are methods and systems for the identification and/or quantification of enantiomers using differential mobility spectrometry (DMS). In accordance with various aspects of the present teachings, the methods can comprise reacting enantiomers of an enantiomeric isomeric pair to form a pair of diastereomers (each of which corresponds to one of the enantiomers covalently bound to a reagent) and separating the diastereomers via DMS. In various aspects, the reagent itself comprises an enantiomerically-pure species (e.g., the enantiomeric excess of one enantiomer is greater than 90%, greater than 95%, greater than 98%, or substantially 100% of the chiral stereoisomers in the reagent). In accordance with various aspects of the present teachings, certain embodiments relate to a method of analyzing a sample containing or suspected of containing at least one enantiomer of an enantiomeric isomer pair, the method comprising: transporting one or more diastereomers each of which is derived from a single enantiomer of the enantiomeric pair through a differential spectrometer to effect separation of the one or more diastereomers. In some related aspects, for example, the one or more diastereomers can comprise a first diastereomer corresponding to a first enantiomer of the enantiomeric isomer pair and a second diastereomer corresponding to a second enantiomer of the enantiomeric pair, the method further comprising determining the relative abundance in the sample of the first enantiomer and the second enantiomer based on the relative abundance of the diastereomers following differential mobility separation.

In accordance with various aspects of the present teachings, certain embodiments relate to a method of analyzing a sample containing or suspected of containing at least one enantiomer of an enantiomeric isomer pair, the method comprising: reacting each enantiomer (if present within the sample) of an enantiomeric isomer pair with a derivatizing reagent so as to form diastereomers corresponding to each enantiomer of the enantiomeric pair; ionizing said diastereomers so as to form ionized diastereomers; and transporting said ionized diastereomers through a differential mobility spectrometer to effect separation of said ionized diastereomers corresponding to each enantiomer of the enantiomeric pair.

In some aspects, for example, the differential mobility spectrometer can comprise a High-Field Asymmetric Waveform Ion Mobility Spectrometer (FAIMS). In some aspects, a compensation voltage and a separation voltage can be applied to the differential mobility spectrometer while the ionized diastereomers are being transported therethrough such that one of the ionized diastereomers is selectively or preferentially transmitted from the differential mobility spectrometer based on its mobility characteristics therewithin. In some related aspects, the method can further comprise scanning the compensation voltage while maintaining the separation voltage at a fixed value. In some various aspects, the method can include adjusting at least one of the compensation voltage and the separation voltage after a first duration so as to transmit the other of said ionized diastereomers selectively for a second duration. In some exemplary aspects, the method can comprise detecting the ionized diastereomers transported from the differential mobility spectrometer at a first combination of compensation voltage and separation voltage and at a second combination of compensation voltage and separation voltage applied to the differential mobility spectrometer, wherein the first combination is configured to optimize transmission of the ionized diastereomer corresponding to a first enantiomer of the enantiomeric pair and the second combination is configured to optimize transmission of the ionized diastereomer corresponding to a second enantiomer of the enantiomeric pair. In some aspects, the relative abundance in the sample of the first and second enantiomers of the enantiomeric pair can be detected, for example, based on the relative abundance of the ionized diastereomers detected at the compensation voltage and separation voltage corresponding to the conditions under which each of the ionized diastereomers is selectively transmitted.

In accordance with the present teachings, the differential mobility spectrometer can be operated in a variety of manners so as to effect the separation of the ionized diastereomers. For example, the method can further comprise adding a chemical modifier to a drift gas for transporting said ionized diastereomers through the differential mobility spectrometer. The chemical modifier can be selected from the group consisting of water, methanol, isopropanol, acetonitrile, and acetone, all by way of non-limiting example. Additionally or alternatively, in some aspects the method can include modulating a throttle gas flow rate to modulate a drift time of the one or more ionized diastereomers in the differential mobility spectrometer.

The derivatizing reagents can comprise a variety of compounds in accordance with various aspects of the present teachings, but are generally configured to be reacted with the enantiomers in the sample so as to form a diastereomer corresponding to each enantiomer of the enantiomeric pair. In various aspects, the reagent can be an enantiomerically-pure compound having at least one chiral center. By way of non-limiting example, the reagent can be an acyl halide or a carboxylic acid. Exemplary examples of enantiomerically-pure acyl halides include S-(−)-N-(trifluoroacetyl)prolyl chloride, R-(+)-N-(trifluoroacetyl)propyl chloride, (S)-(+)-α-Methoxy-α-(trifluoromethyl)phenylacetyl chloride, (R)-(−)-α-Methoxy-α-(trifluoromethyl)phenylacetyl chloride, 1R,4R-camphanic chloride, 1R,4S-camphanic chloride, 1S,4R-camphanic chloride, and 1S,4S-camphanic chloride. The derivatizing reagent can comprise a molecule containing one or more chiral centers. By way of example, the derivatizing reagent can comprise a molecule containing a single chiral center or two chiral centers. The derivatizing reagent can be reacted with the sample enantiomers in a variety of manners so as to form the diastereomers in accordance with various aspects of the present teachings. In some aspects, for example, the enantiomers can contain a functional group that comprises at least one of a hydroxyl group and a primary amine, and the step of reacting enantiomers with the derivatizing reagent can comprise covalently bonding one or more of said groups to said derivatizing reagent.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly, it will be apparent that the described embodiments may be susceptible to alteration or variation according to common general knowledge without departing from the scope of the disclosure. The following detailed description of embodiments is not to be regarded as limiting the scope of the applicant's teachings in any manner.

Methods and systems for the identification and/or quantification of enantiomers using differential mobility spectrometry (DMS) are provided herein. In accordance with various aspects of the present teachings, the methods can comprise reacting the enantiomers of an enantiomeric isomeric pair to form a pair of diastereomers and separating the diastereomers via DMS based on the diastereomers' different mobility characteristics. In various aspects, the diastereomers can be formed by covalently binding the enantiomers with a reagent, which itself can comprise an enantiomer in a enantiomerically-pure form (e.g., one enantiomer of an enantiomeric pair comprises greater than 90%, greater than 95%, greater than 98%, or substantially all of the total quantity of the enantiomers of the enantiomeric pair in the reagent). As used herein, the term enantiomers refers to stereoisomers having one or more chiral centers (each of which exhibits arrangements of its functional groups such that the enantiomers of an enantiomeric pair are non-superimposable mirror images of one another), while the term diastereomers refers to stereoisomers having two or more chiral centers (only some of which exhibit different configurations of the related functional groups).

Figure 1:
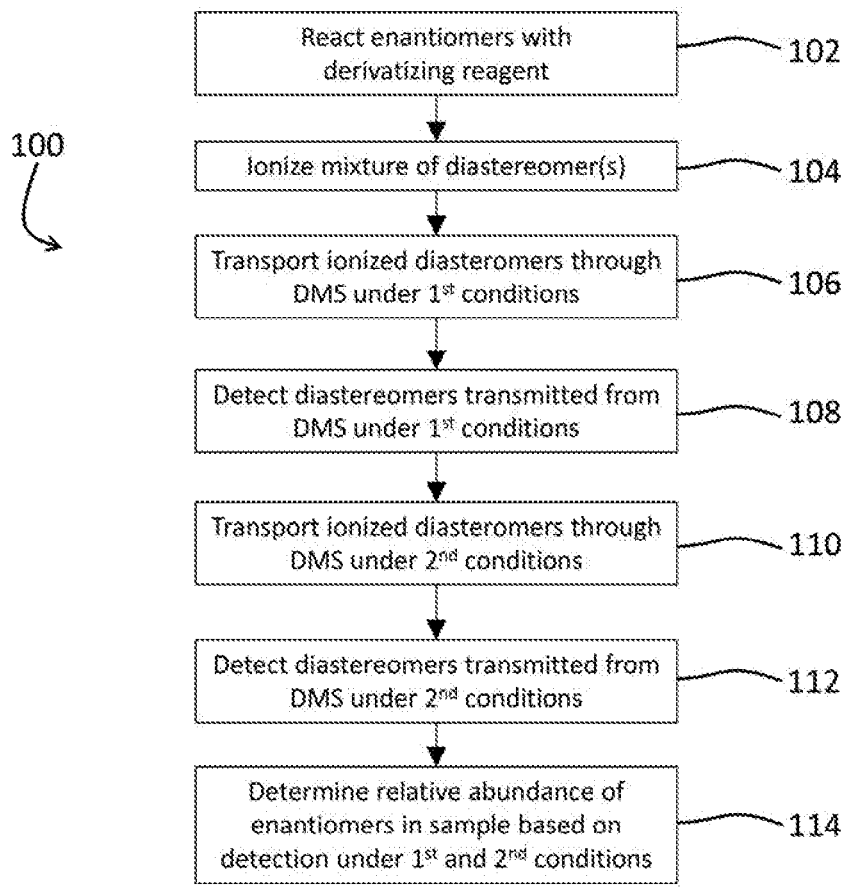
FIG. 1 is a schematic workflow for analyzing a sample containing or suspected of containing at least one enantiomer of an enantiomeric isomer pair in accordance with various aspects of the present teachings.

For example, with reference now to FIG. 1, an exemplary method 100 for identifying and/or quantifying the enantiomers within a sample is depicted in accordance with various aspects of the present teachings. As shown in step 102, a sample containing or suspected of containing one or both enantiomers of an enantiomeric pair can be reacted with a derivatizing reagent so as to form diastereomers, each of which can correspond to one of the enantiomers (if present) covalently bound to the derivatizing reagent.

The enantiomers can be present in a variety of samples, including, for example, a biological sample. Biological samples can comprise any bodily fluid, such as an intracellular fluid, an extracellular fluid, urine, blood, CSF (cerebrospinal fluid), saliva, bile, amniotic fluid, lymph, etc. The sample can also comprise, for example, a crude sample or a purified sample, and it will be appreciated that one or more additional steps of sample processing can be performed before and/or after step 102, for example, so as to remove contaminants or otherwise purify the enantiomers within a sample and/or the diastereomeric reaction products. By way of non-limiting example, any of gas chromatography, liquid chromatography, or capillary electrophoresis can be used to purify the sample prior to step 102 and/or to purify the reaction products prior to further processing as discussed below.

It will be appreciated that the methods and systems described herein can be used to analyze a variety of enantiomers having one or more chiral centers in which the spatial distribution of the functional groups about the chiral center(s) are different such that the enantiomers of an enantiomeric pair are mirror images of one another. By way of example, warfarin, an anticoagulant that can be used for the prevention of thrombosis, is a chiral compound comprising the enantiomers R-warfarin and S-warfarin, as shown below. Each enantiomer of this enantiomeric pair is metabolized in the body by different pathways, with the S-warfarin enantiomer exhibiting higher potency than the R-warfarin in producing an anticoagulant response.

Amphetamine is another example of a chiral compound comprising an enantiomeric pair of R-amphetamine enantiomer (also known as levoamphetamine) and S-amphetamine enantiomer (also known as dextroamphetamine), which can exhibit pharmacological properties and different half-lives in the body.

Methamphetamine is another example of a chiral compound comprising an enantiomeric pair of S-methamphetamine enantiomer and R-methamphetamine enantiomer, the former of which is a psychoactive street drug and the latter of which is a nasal decongestant.

In various aspects, it can be preferred that the enantiomers of the enantiomeric isomer pair exhibit one or more functional groups that can be replaced in its reaction with the derivatizing reagent. By way of example, the enantiomers can comprise one or more functional groups (e.g., electron donating group and/or electron withdrawing group), such as hydroxyl groups and/or primary amine groups, disposed at different locations of a compound.

The derivatizing reagents can comprise a variety of compounds in accordance with various aspects of the present teachings, but generally include one or more chiral centers such that their reaction with the enantiomer results in a diastereomeric reaction product in which the number of chiral centers is greater than that in each enantiomer alone. As noted above, the diastereomeric reaction products from each enantiomer are not mirror images of one another due to the common spatial arrangement of the functional groups about at least one but less than all of the chiral centers in the reaction product. In various aspects, the derivatizing reagent itself can comprise an enantiomer, and can be preferably in an enantiomerically-pure form. As used herein, "enantiomerically-pure" refers to a derivatizing reagent in which a single stereoisomer of the chiral stereoisomeric forms of the derivatizing reagent comprises greater than 90% (e.g., greater than 95%, greater than 98%, or substantially 100%) of the total quantity of the chiral stereoisomers in the reagent. For example, in the case of a derivatizing reagent exhibiting a single chiral center (and thus two enantiomeric forms), the derivatizing reagent is "enantiomerically pure" if one enantiomer comprises greater than 90%, greater than 95%, greater than 98%, or substantially 100% of the total quantity of the enantiomers of the enantiomeric pair in the reagent. In the case of a derivatizing reagent having two or more chiral centers, the derivatizing reagent is "enantiomerically pure" if one enantiomer comprises greater than 90%, greater than 95%, greater than 98%, or substantially 100% of the total quantity of the chiral stereoisomers (i.e., of all of the enantiomeric and diastereomeric forms of the molecule) in the reagent. In this manner, it will be appreciated that the reaction of the sample enantiomers occurs in a defined chiral environment so as to provide reaction products substantially consisting of only two diastereomers, each of which corresponds to one of the enantiomers of the enantiomeric isomer pair in the sample bound to the same enantiomeric form of the reagent. In some aspects, the derivatizing reagent can include one or more functional groups (e.g., electron donating group and/or electron withdrawing group), such as hydroxyl groups and/or primary amine groups, that can react with one of the enantiomers of the enantiomeric isomer pair. The derivatizing reagent can comprise one or more functional groups (e.g., an acyl halide functional group) that is configured to react rapidly, reproducibly, and symmetrically with a hydroxyl or amine group of each enantiomer of the enantiomeric isomer pair. By way of non-limiting example, some exemplary derivatizing reagents comprise camphanic chloride; N-(trifluoroacetyl)prolyl chloride; BOC-L-cysteine; Nα-(2,4-Dinitro-5-fluorophenyl)-L-valinamide; N-Isobutyryl-L-cysteine; Nα-(2,4-Dinitro-5-fluorophenyl)-L-alaninamide; 2,3,4,6-Tetra-O-acetyl-β-D-glucopyranosyl isothiocyanate; 2,3,4-Tri-O-acetyl-α-D-arabinopyranosyl isothiocyanate; (1R,4aS,10aR)-7-Isopropyl-1-isothiocyanato-1,4a-dimethyl-1,2,3,4,4a,9,10,10a-octahydrophenanthrene; N-(7-Nitro-4-benzofurazanyl)-L-prolyl chloride; R(−)-α-Methoxy-α-trifluoro-methyl-phenylacetic acid; R(−)-1-(1-Naphthyl)ethylisocyanate; (R)-(+)-α-Methylbenzyl isocyanate; GC R(+)-α-Methoxy-α-trifluoromethylphenylacetic acid; R(+)-1-(1-Naphthyl)ethylamine; R(+)-1-Phenylethanol; and (R)-(+)-α-Methylbenzylamine.

Figure 2A:
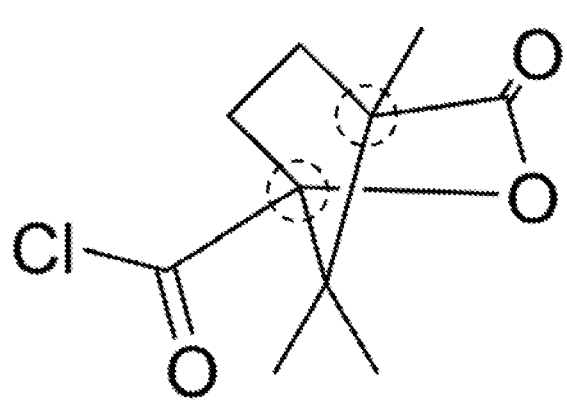
FIGS. 2A and 2B illustrate the chemical structure of two exemplary derivatizing reagents, namely camphanic chloride (FIG. 2A) and N-(trifluoroacetyl)prolyl chloride (TPC) (FIG. 2B), for use in accordance with various aspects of the applicant's teachings.
Figure 2B:
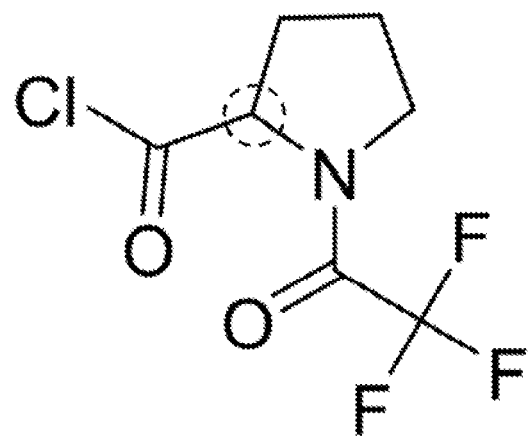

With reference now to FIGS. 2A-B, two enantiomerically-pure derivatizing reagents suitable for use as derivatizing reagents in accordance with various aspects of the present teachings are depicted: camphanic chloride (FIG. 2A) and N-(trifluoroacetyl)prolyl chloride and (FIG. 2B), each of which is commercially available in enantiomerically-pure form. As indicated by the broken circles in FIGS. 2A and 2B, these exemplary derivatizing reagents comprise at least one chiral center (two in the case of camphanic chloride). Due to these two chiral centers, camphanic chloride can exhibit four stereoisomers: 1R,4R-camphanic chloride, 1R,4S-camphanic chloride, 1S,4R-camphanic chloride, and 1S,4S-camphanic chloride. It will be appreciated by a person skilled in the art that of these four chiral forms of camphanic chloride, 1R,4R-camphanic chloride and 1S,4S-camphanic chloride represent one enantiomeric pair while 1R,4S-camphanic chloride and 1S,4R-camphanic chloride represent a second enantiomeric pair. It is also noted for example that 1R,4R-camphanic chloride and 1R,4S-camphanic chloride are considered diastereomers relative to one another due to the common R-configuration about one of the chiral centers (i.e., 1R). Similarly, 1R,4R-camphanic chloride and 1S,4R-camphanic chloride are considered diastereomers relative to one another due to the common R-configuration about one of the chiral centers (i.e., 4R). With respect to the case of camphanic chloride, for example, it will be appreciated that the derivatizing reagent will be considered enantiomerically-pure within the meaning of the present teachings if one of the four chiral stereoisomers forms of camphanic chloride comprises greater than 90% of the total quantity of 1R,4R-camphanic chloride, 1R,4S-camphanic chloride, 1S,4R-camphanic chloride, and 1S,4S-camphanic chloride. It will be noted that N-(trifluoroacetyl)prolyl chloride is an enantiomer that exhibits two stereoisomeric forms due its single chiral centers: S-(−)-N-(trifluoroacetyl)prolyl chloride and its enantiomer R-(−)-N-(trifluoroacetyl)propyl chloride. Thus, with respect to the case of N-(trifluoroacetyl)prolyl chloride, for example, it will be appreciated that the derivatizing reagent will be considered enantiomerically-pure within the meaning of the present teachings if one enantiomer comprises greater than 90% of the total quantity of S-(−)-N-(trifluoroacetyl)prolyl chloride and its enantiomer R-(−)-N-(trifluoroacetyl)propyl chloride.

Figure 3:
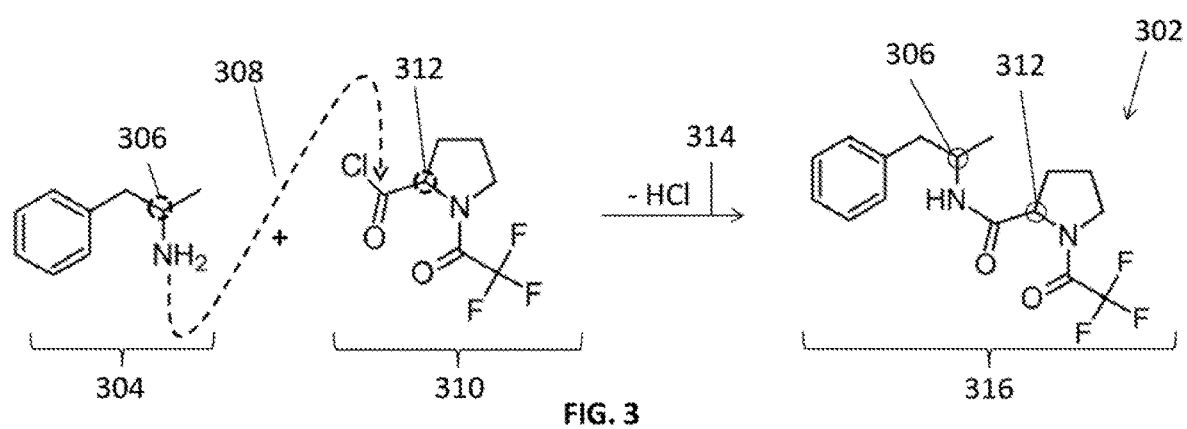
FIG. 3 schematically depicts an exemplary reaction of a sample enantiomer (R/S-amphetamine) with the enantiomerically pure derivatizing reagent of FIG. 2B ((S)-(−)-N-(trifluoroacetyl)prolyl chloride) to result in a mixture of diastereomers (S,S)- and (R,S)-TPC amphetamine, in accordance with various aspects of the present teachings.

It will be also be noted with respect to FIGS. 2A and 2B that though each of these exemplary derivatizing reagents includes an acyl halide group that can react with the enantiomers as described below with respect to FIGS. 3-5, enantiomerically-pure derivatizing reagents comprising other functional groups such as amines and alcohols can be used in accordance with various aspects of the present teachings to react with the sample enantiomers, all by way of non-limiting example. With specific reference now to FIG. 3, an exemplary reaction scheme 302 is depicted for reacting the enantiomers R/S-amphetamine 304 with enantiomerically-pure S-(−)-N-(trifluoroacetyl)prolyl chloride 310. Specifically, the hydroxyl group of the amphetamine 304 (which exhibits one chiral center and is present in both enantiomeric forms R-amphetamine and S-amphetamine) reacts 308 with the carbon from the acyl halide group of the S-(−)-N-(trifluoroacetyl)prolyl chloride enantiomer (exhibiting one chiral centers 312). As shown, the resulting product N-(trifluoroacetyl)prolyl amphetamine 316 exhibits two chiral centers (306 and 312) and would be present in two diastereomeric forms (S,S-(trifluoroacetyl)prolyl amphetamine and R,S-(trifluoroacetyl)prolyl amphetamine). It will be noted that the products 316 are considered diastereomers relative to one another because they exhibit a common S configuration about one of the chiral centers. Assuming that the enantiomerically-pure S-(−)-N-(trifluoroacetyl)prolyl chloride reacts symmetrically with the enantiomeric forms of amphetamine, the resulting mixture of diastereomeric products should be found in the same proportion to one another as the enantiomers of amphetamine present in the sample.

Figure 4:
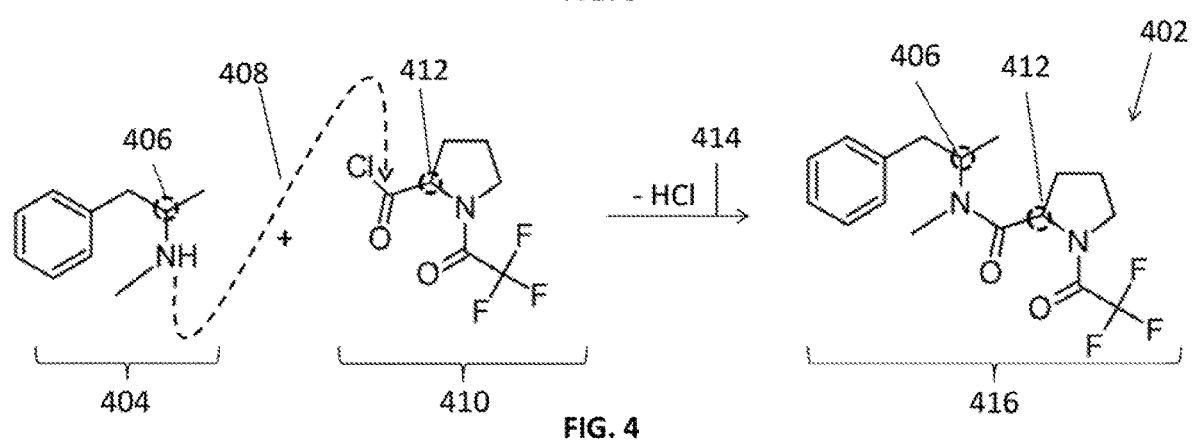
FIG. 4 schematically depicts an exemplary reaction of a sample enantiomer (R/S-methamphetamine) with the enantiomerically pure derivatizing reagent of FIG. 2B ((S)-(−)-N-(trifluoroacetyl)prolyl chloride) to result in a mixture of diastereomers comprising (R,S)- and (S,S)-TPC methamphetamine, in accordance with various aspects of the present teachings.

With reference now to FIG. 4, an exemplary reaction scheme 402 is depicted for reacting the enantiomers R/S-methamphetamine 404 with enantiomerically-pure S-(−)-N-(trifluoroacetyl)prolyl chloride 410. Specifically, the amine group of the methamphetamine 404 (which exhibits one chiral center and is present in enantiomeric forms R-methamphetamine and S-methamphetamine) reacts 408 with the carbon from the acyl halide group of the (trifluoroacetyl)prolyl chloride enantiomer 410 (exhibiting one chiral center 412). As shown, the resulting product N-(trifluoroacetyl)prolyl methamphetamine 416 exhibits two chiral centers (406 and 412) and would be present in two diastereomeric forms (S,S)-N-(trifluoroacetyl)prolyl methamphetamine and (R,S)-N-(trifluoroacetyl)prolyl methamphetamine). It will be noted that the products 416 are considered diastereomers relative to one another because they exhibit a common S configuration about one of the two chiral centers. Assuming that the enantiomerically-pure S-(−)-N-(trifluoroacetyl)prolyl chloride reacts symmetrically with the enantiomeric forms of methamphetamine, the resulting mixture of diastereomeric products should be found in the same proportion to one another as the enantiomers of methamphetamine present in the sample.

Figure 5:
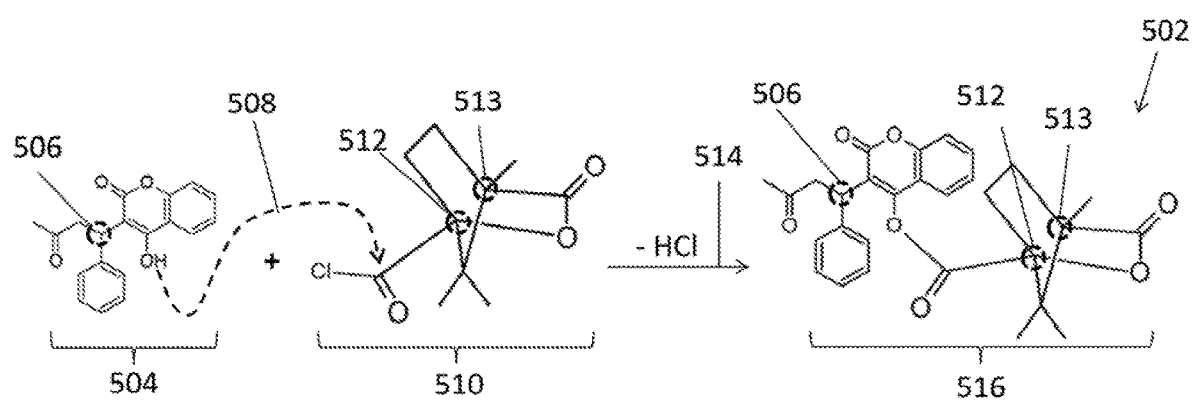
FIG. 5 schematically depicts an exemplary reaction of a sample enantiomer (R/S-warfarin) with the diastereomerically pure derivatizing reagent of FIG. 2A ((1S,4R)-camphanic chloride) to result in a mixture of diastereomers (R,S,R)- and (S,S,R)-camphanyl warfarin, in accordance with various aspects of the present teachings.

With specific reference now to FIG. 5, an exemplary reaction scheme 502 is depicted for reacting the sample enantiomers R/S-warfarin 504 with enantiomerically-pure 1S,4R-camphanic chloride 510. Specifically, the hydroxyl group of the warfarin 504 (which exhibits one chiral center and is present in both enantiomeric forms R-warfarin and S-warfarin) reacts 508 with the carbon from the acyl halide group of the 1S-4R-camphanic chloride enantiomer 510 (exhibiting two chiral centers 512, 513). As shown, the resulting product camphanyl warfarin 516 exhibits three chiral centers (506, 512, and 513) and would be present in two diastereomeric forms (R,S,R-camphanyl warfarin and S,S,R-camphanyl warfarin). It will be noted that the products 516 are considered diastereomers relative to one another because they exhibit a common S,R configuration respectively about two of the chiral centers. Assuming that the enantiomerically-pure 1S,4R-camphanic chloride reacts symmetrically with the enantiomeric forms of warfarin, the resulting mixture of diastereomeric products should be found in the same proportion to one another as the enantiomers of warfarin present in the sample.

With reference again to the exemplary method of analyzing a sample depicted in FIG. 1, after the enantiomer(s) of the enantiomeric pair are reacted in step 102 to generate the diastereomeric forms corresponding to the enantiomers present in the sample, the reaction products can then be ionized (e.g., via an ion source) as shown in step 104 and subjected to DMS so as to separate the ionized diastereomers based on their differential mobilities. Though enantiomers of an enantiomeric isomeric pair may not exhibit any, or significant, differences in their ion mobilities such that they can be separated by the DMS in their enantiomeric form (i.e., both forms of enantiomers would be simultaneously transmitted by the DMS), the covalent bonding of the derivatizing reagent to the enantiomers in step 102 can form diastereomers that exhibit sufficient differences in their molecular structures such that they can be resolved under certain DMS conditions due to different mobilities in accordance with various aspects the present teachings. As will be discussed in detail below, for example, the separation voltage (SV) and the compensation voltage (CoV) in the DMS can each be set to particular values such that the ionized diastereomer corresponding to a first enantiomer of enantiomeric isomer pair can be transmitted from the DMS in higher abundance relative to the ionized diastereomer corresponding to the second enantiomer in the enantiomeric isomer pair, which can be neutralized at the electrodes of the DMS (step 106). At these first values for CoV and SV, ions transmitted from the DMS can then be detected in step 108. In some aspects, one of the SV and the CoV can then be adjusted so as to selectively transmit the ionized diastereomer corresponding to the other enantiomer of the enantiomeric isomeric pair (step 110), with the ions transmitted from the DMS under these different DMS conditions being detected as in step 112. Based on the results of the detections in steps 108 and 112, for example, the relative proportion of the enantiomers and/or their quantity in the sample can then be determined in step 114 because the mixture of diastereomeric products that is ionized in step 104 should also be in the same proportion as the respective enantiomers present in the sample.

Figure 6:
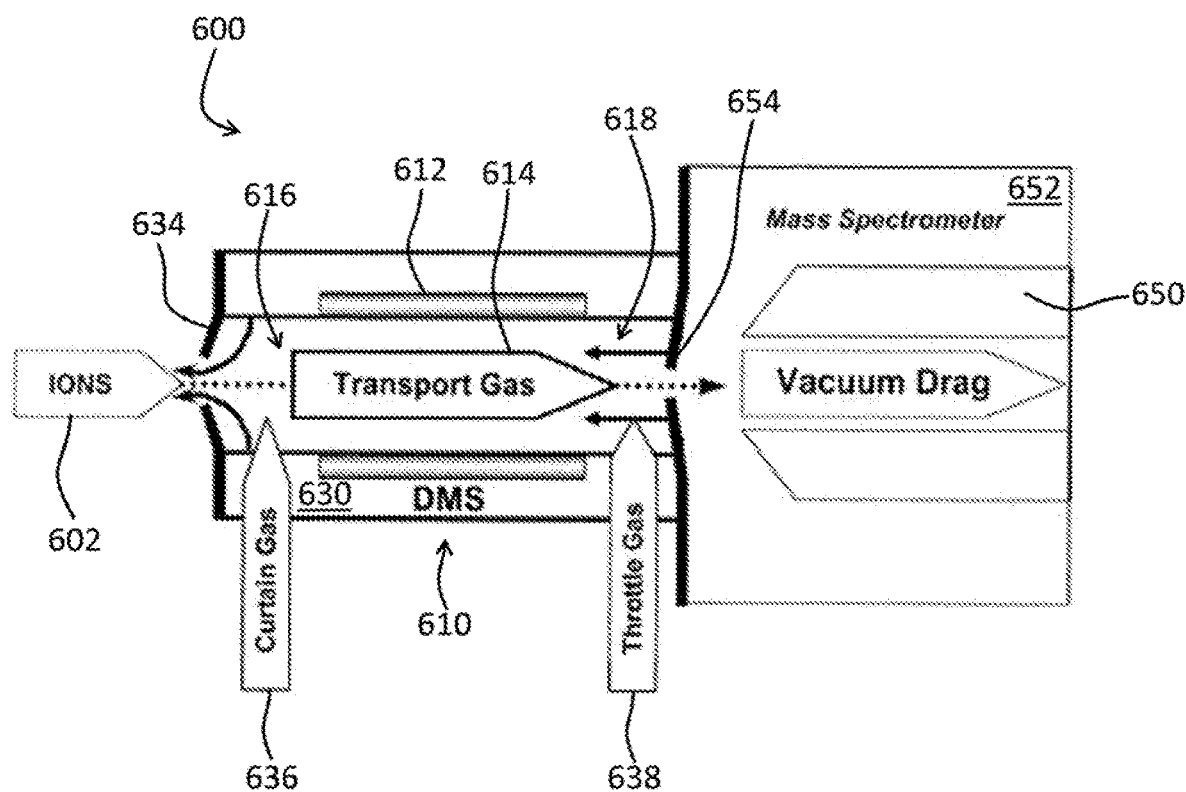
FIG. 6 is a schematic representation of an exemplary differential mobility spectrometer/mass spectrometer system in accordance with an aspect of various embodiments of the applicant's teachings.

With reference now to FIG. 6, an exemplary system for analyzing and/or quantifying the enantiomers of an enantiomeric pair as depicted in FIG. 1 will now be described. Specifically, after the one or more diastereomers are formed from the reaction of the enantiomers with the derivatizing reagent in step 102, the mixture of diastereomeric reaction products can be subjected to ionization, differential mobility spectrometry, and detection in the system 600, as discussed in detail below. As will be appreciated by a person skilled in the art, however, the exemplary system 600 represents only one possible configuration for use in accordance with various aspects of the systems, devices, and methods described herein.

As shown in FIG. 6, the exemplary system 600 generally comprises a differential mobility device 610 in fluid communication with a first vacuum lens element 650 of a mass spectrometer (hereinafter generally designated mass spectrometer 650). The differential mobility device 610 can have a variety of configurations, but is generally configured to resolve ions 602 (e.g., the ionized diastereomers) based on their mobility through a fixed or variable electric field (whereas MS analyzes ions based on their mass-to-charge ratios). It will be appreciated that though the ion mobility device 610 is commonly described herein as a differential mobility spectrometer, the ion mobility device can be any ion mobility device configured to separate ions based on their mobility through a carrier or drift gas, including by way of non-limiting example, an ion mobility spectrometer, a drift-time ion mobility spectrometer, a traveling-wave ion mobility spectrometer, a differential mobility spectrometer, and a high-field asymmetric waveform ion mobility spectrometer (FAIMS) of various geometries such as parallel plate, curved electrode, or cylindrical FAIMS device, among others. In DMS, RF voltages, often referred to as separation voltages (SV), can be applied across the drift tube in a direction perpendicular to that of a drift gas flow. Ions of a given species tend to migrate radially away from the axis of the transport chamber by a characteristic amount during each cycle of the RF waveform due to differences in mobility during the high field and low field portions. A DC potential, commonly referred to as a compensation voltage (CoV), applied to the DMS cell provides a counterbalancing electrostatic force to that of the SV. The CoV can be tuned so as to preferentially prevent the drift of a species of ion of interest. Depending on the application, the CoV can be set to a fixed value to pass only ion species with a particular differential mobility while the remaining species of ions drift toward the electrodes and are neutralized. Alternatively, if the CoV is scanned for a fixed SV as a sample is introduced continuously into the DMS, a mobility spectrum can be produced as the DMS transmits ions of different differential mobilities.

In the exemplary embodiment depicted in FIG. 6, the differential mobility spectrometer 610 is contained within a curtain chamber 630 that is defined by a curtain plate or boundary member 634 and is supplied with a curtain gas 636 from a curtain gas supply (not shown). As shown, the exemplary differential mobility spectrometer 610 comprises a pair of opposed electrode plates 612 that surround a transport gas 614 that drifts from an inlet 616 of the differential mobility spectrometer 610 to an outlet 618 of the differential mobility spectrometer 610. The outlet 618 of the differential mobility spectrometer 610 releases the drift gas 616 into an inlet 654 of a vacuum chamber 652 containing the mass spectrometer 650. A throttle gas 638 can additionally be supplied at the outlet 618 of the differential mobility spectrometer 610 so as to modify the flow rate of transport gas 614 through the differential mobility spectrometer 610.

In accordance with certain aspects of the present teachings, the curtain gas 636 and throttle gas 638 can be set to flow rates determined by a flow controller and valves so as to alter the drift time of ions within the differential mobility spectrometer 610. Each of the curtain and throttle gas supplies can provide the same or different pure or mixed composition gas to the curtain gas chamber. By way of non-limiting example, the curtain gas can be air, $O_2$, He, $N_2$, or $CO_2$. The pressure of the curtain chamber 630 can be maintained, for example, at or near atmospheric pressure (i.e., 760 Torr). Additionally, the system 600 can include a chemical modifier supply (not shown) for supplying a chemical modifier and/or reagent (hereinafter referred as chemical modifier) to the curtain and throttle gases. As will be appreciated by a person skilled in the art, the modifier supply can be a reservoir of a solid, liquid, or gas through which the curtain gas is delivered to the curtain chamber 630. By way of example, the curtain gas can be bubbled through a liquid modifier supply. Alternatively, a modifier liquid or gas can be metered into the curtain gas, for example, through an LC pump, syringe pump, or other dispensing device for dispensing the modifier into the curtain gas at a known rate. For example, the modifier can be introduced using a pump so as to provide a selected concentration of the modifier in the curtain gas. The modifier supply can provide any modifier known in the art including, by way of non-limiting example, water, volatile liquid (e.g., methanol, propanol, acetonitrile, ethanol, acetone, and benzene), including alcohols, alkanes, alkenes, halogenated alkanes and alkenes, furans, esters, ethers, aromatic compounds. As will be appreciated by a person skilled in the art in light of the present teachings, the chemical modifier can interact with the ionized diastereomers such that the ions differentially interact with the modifier (e.g., cluster via hydrogen or ionic bonding) during the high and low field portions of the SV, thereby effecting the CoV needed to counterbalance a given SV. In some cases, this can increase the separation between the diastereomeric adducts.

Ions 602 (e.g., ionized diastereomers) can be generated by an ion source (not shown) and emitted into the curtain chamber 630 via curtain chamber inlet 650. As will be appreciated by a person skilled in the art, the ion source can be virtually any ion source known in the art, including for example, an electrospray ionization (ESI) source. The pressure of the curtain gases in the curtain chamber 630 (e.g., ~760 Torr) can provide both a curtain gas outflow out of curtain gas chamber inlet, as well as a curtain gas inflow into the differential mobility spectrometer 610, which inflow becomes the transport gas 614 that carries the ions 602 through the differential mobility spectrometer 610 and into the mass spectrometer 650 contained within the vacuum chamber 652, which can be maintained at a much lower pressure than the curtain chamber 630. By way of non-limiting example, the vacuum chamber 652 can be maintained at a pressure lower than that of the curtain chamber 630 (e.g., by a vacuum pump) so as to drag the transport gas 614 and ions 602 entrained therein into the inlet 654 of the mass spectrometer 650. It will be appreciated by those skilled in the art in light of the present teachings that the diastereomers (or the mixture containing the same) can be delivered to the ion source 602 from a variety of sample sources, including through direct injection, pumping from a reservoir containing a fluid sample, and via a liquid chromatography (LC) column, by way of non-limiting examples.

As will be appreciated by a person skilled in the art, the differential mobility/mass spectrometer system 600 can additionally include one or more additional mass analyzer elements downstream from vacuum chamber 652. Ions 602 can be transported through vacuum chamber 652 and through one or more additional differentially pumped vacuum stages containing one or more mass analyzer elements. For instance, in one embodiment, a triple quadrupole mass spectrometer may comprise three differentially pumped vacuum stages, including a first stage maintained at a pressure of approximately 2.3 Torr, a second stage maintained at a pressure of approximately 6 mTorr, and a third stage maintained at a pressure of approximately $10^{-5}$ Torr. The third vacuum stage can contain a detector, as well as two quadrupole mass analyzers with a collision cell located between them. It will be apparent to those skilled in the art that there may be a number of other ion optical elements in the system. Alternatively, a detector (e.g., a Faraday cup or other ion current measuring device) effective to detect the ions transmitted by the differential mobility spectrometer 610 can be disposed directly at the outlet of the differential mobility spectrometer 610. It will be apparent to those skilled in the art that the mass spectrometer employed could take the form of a quadrupole mass spectrometer, triple quadrupole mass spectrometer, time-of-flight mass spectrometer, FT-ICR mass spectrometer, or Orbitrap mass spectrometer, all by way of non-limiting example.

EXAMPLES

The applicant's teachings can be even more fully understood with reference to the following examples and data presented in FIGS. 7A-C, 8A-C, and 9A-C, which demonstrate the separation of sample enantiomers using differential mobility spectrometry in accordance with various aspects of the teachings herein. Other embodiments of the applicant's teachings will be apparent to those skilled in the art from consideration of the present specification and practice of the present teachings disclosed herein. It is intended that these examples be considered as exemplary only.

Example 1

Figure 7A:
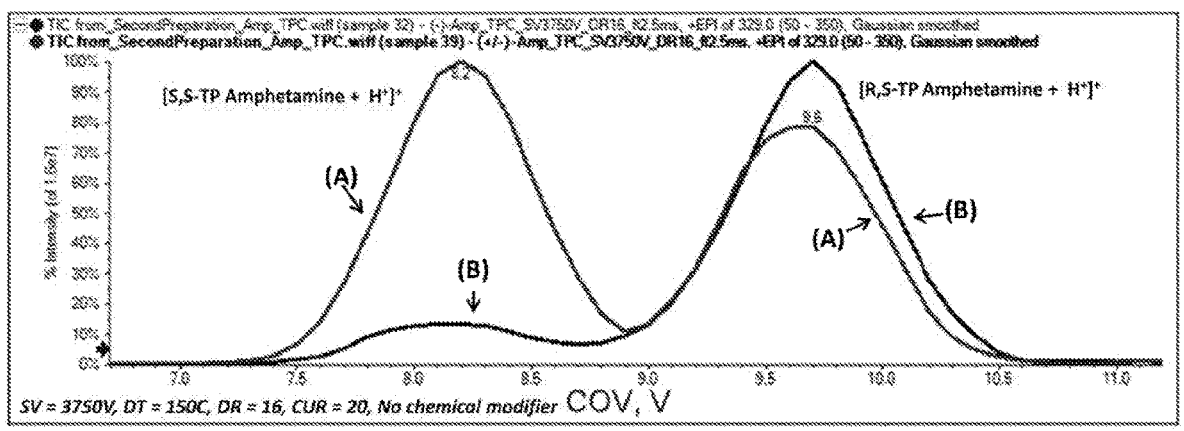
FIG. 7A illustrates an exemplary ionogram generated from samples containing a mixture of (S,S)- and (R,S)-TP amphetamine (curve A) and (R,S)-TP amphetamine (curve B).
Figure 7B:
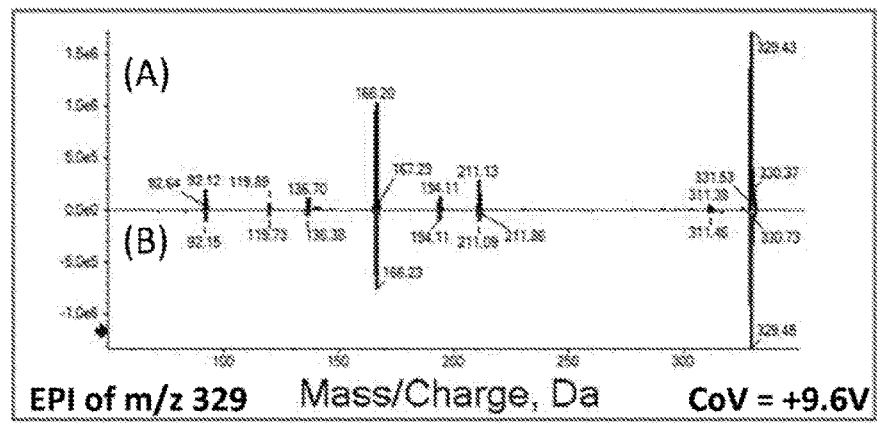
FIG. 7B illustrates an exemplary mass spectrum (EPI, enhanced product ion) for the ions transmitted from the DMS operating at CoV=+9.6 V, from samples containing a mixture of (S,S)- and (R,S)-TP amphetamine (top, curve A of FIG. 6A) and (R,S)-TP amphetamine (bottom, curve B of FIG. 6A).
Figure 7C:
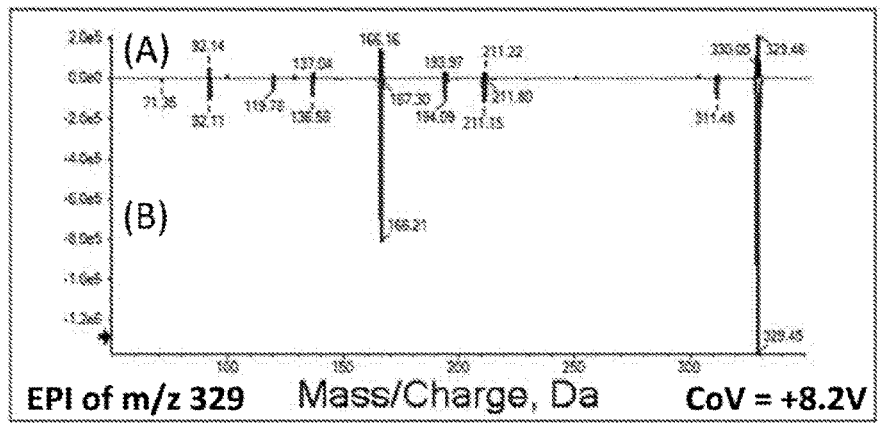
FIG. 7C illustrates an exemplary mass spectrum (EPI, enhanced product ion) for the ions transmitted from the DMS operating at CoV=+8.2 V, from samples containing a mixture of (S,S)- and (R,S)-TP amphetamine (top, curve A of FIG. 6A) and (R,S)-TP amphetamine (bottom, curve B of FIG. 6A).

With reference first to FIGS. 7A-C, exemplary data are depicted demonstrating the separation of the enantiomeric forms of amphetamine using differential mobility spectrometry. As discussed above, amphetamine represents a chiral compound having two enantiomeric forms: R- and S-amphetamine. Though conventional DMS methods and systems are generally unable to resolve these enantiomers such that the individual enantiomers can be confirmed and/or quantified, methods and systems in accordance with various aspects of the present teachings can allow for this determination by reacting a sample containing the enantiomers of R- and S-amphetamine with an enantiomerically-pure S-(−)-N-(trifluoroacetyl)prolyl chloride, as discussed above with reference to FIG. 3. As shown in FIG. 7A, ionogram are shown for two samples of derivatized amphetamine diastereomers. In sample A, the amphetamine comprised a racemic mixture of R- and S-amphetamine, each of which is reacted with S-(−)-N-(trifluoroacetyl)prolyl chloride so as to generate a sample containing 555 ng/mL of two diastereomeric forms: R,S-TP amphetamine and S,S-TP amphetamine. In sample B, the amphetamine comprised a pure R-amphetamine such that the reaction resulted in a single diastereomeric form in the sample at 555 ng/mL: R,S-TP amphetamine. The ionogram of FIG. 7A was generated by operating the differential mobility spectrometer (SelexION™, SCIEX, Concord, ON) at a separation voltage (SV) of 3750V, DMS temperature (DT) of 150° C., resolving gas pressure (DR) of 16 psi, curtain gas pressure (CUR) of 16 psi, and without a chemical modifier in the drift gas, as the compensation voltage (CoV) applied to the DMS was scanned from about +6.5 V to about +12V DC. The DMS was mounted on a 5500 QTRAP® system (SCIEX), with the total ion intensity (y-axis) reflecting the count of ions transmitted by the DMS at each CoV.

As shown in FIG. 7A, the curve for sample A containing the two diastereomers of amphetamine exhibits CoV peaks at +8.2 V and +9.6 V. The curve for sample B containing only one of the diastereomers of sample A (i.e., R,S-TP amphetamine) exhibited a single peak at +9.6 V. The ionograms of FIG. 7A suggest that the peak at +9.6 V in sample A likely represents the transmission of R,S-TP amphetamine ions from sample A, while the peak at +8.2 V for sample A represents the S,S-TP amphetamine ions since it does not align with a peak of curve B. While there is an additional minor peak for curve B (e.g., at +8.2 V), this peak was likely due to contamination of the R-amphetamine with a small amount of S-amphetamine.

This is further confirmed by the mass chromatograms of FIGS. 7B and 7C, which depict the m/z ratios of the fragmentation products of the ions transmitted by the DMS at the CoVs of +9.6 V (FIG. 7B) and +8.2 V (FIG. 7C) and generated by the 5500 QTRAP® MS system operated in EPI mode. With reference to FIG. 7B, ions of m/z 329 that were transmitted at DMS conditions of CoV=+9.6 V exhibit the same product ions for both sample A (top) and sample B (bottom). This further confirms that the ions from sample A transmitted by the DMS at CoV=+9.6 V represent the (R,S)-N-(trifluoroacetyl)prolyl amphetamine diastereomer form resulting from the R-amphetamine enantiomer present in the sample. With reference to FIG. 7C, it will be observed that the ions of m/z 329 that were transmitted at DMS conditions of CoV=+8.2 V did not exhibit the same intensity of product ions for sample A (top) and sample B (bottom). Specifically, though the product ions exhibited similar m/z between sample A and sample B in FIG. 7C, the product ion intensity of sample B was significantly more intense than the product ion intensity of sample A. Based on these data, it was confirmed that the ions from sample A transmitted by the DMS at CoV=+9.6 V represent the (S,S)-N-(trifluoroacetyl)prolyl amphetamine diastereomer, and further that the pure R-amphetamine standard utilized to produce sample B was contaminated with S-amphetamine.

Example 2

Figure 8A:
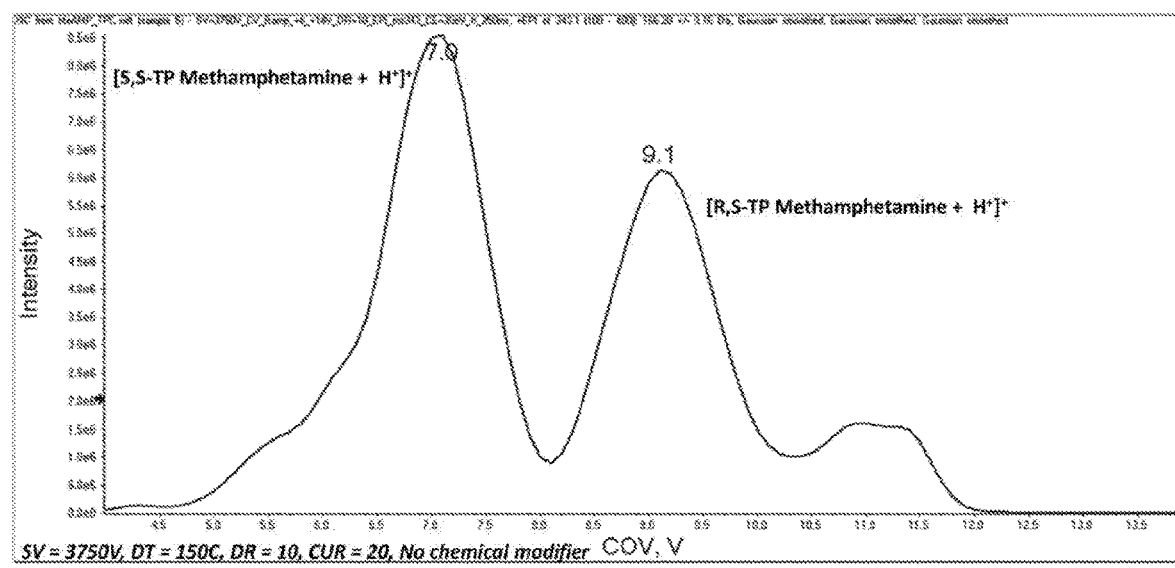
FIG. 8A illustrates an exemplary ionogram generated from a sample containing a mixture of (S,S)- and (R,S)-N-(trifluoroacetyl)prolyl methamphetamine.
Figure 8B:
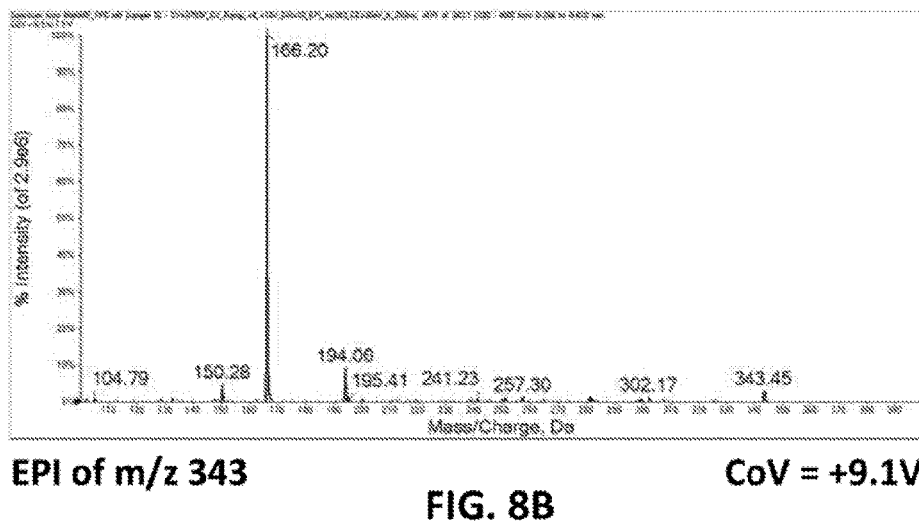
FIG. 8B illustrates an exemplary mass spectrum (EPI, enhanced product ion) for the ions transmitted from the DMS operating at CoV=+9.1 V, from the sample containing a mixture of (S,S)- and (R,S)-N-(trifluoroacetyl)prolyl methamphetamine.
Figure 8C:
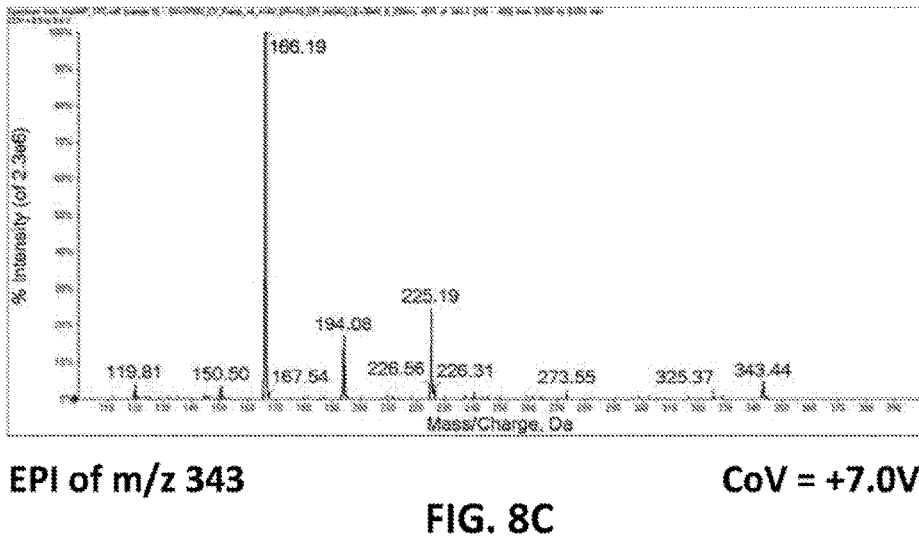
FIG. 8C illustrates an exemplary mass spectrum (EPI, enhanced product ion) for the ions transmitted from the DMS operating at CoV=+7.0 V, from the sample containing a mixture of (S,S)- and (R,S)-N-(trifluoroacetyl)prolyl methamphetamine.

With reference now to FIGS. 8A-C, exemplary data are depicted demonstrating the separation of the enantiomeric forms of methamphetamine using DMS. As discussed above, methamphetamine represents a chiral compound having two enantiomeric forms R- and S-methamphetamine, which can be separately identified and/or quantified in accordance with various aspects of the present teachings by reacting the sample with a derivatizing reagent such that the enantiomerically-pure S-(−)-N-(trifluoroacetyl)prolyl chloride covalently bonds to the R/S methamphetamines, as discussed above with reference to FIG. 4.

As shown in FIG. 8A, ion mobility spectra are shown for derivatized methamphetamine diastereomers resulting from the reaction of a racemic mixture of R- and S-methamphetamine with S-(−)-N-(trifluoroacetyl)prolyl chloride so as to generate a sample containing 555 ng/mL of the two diastereomeric forms: (S,S)-N-(trifluoroacetyl)prolyl methamphetamine and (R,S)-N-(trifluoroacetyl)prolyl methamphetamine. The ionogram of FIG. 8A was generated by operating the differential mobility spectrometer (SelexION™, SCIEX, Concord, ON) at a SV of 3750V, DT of 150° C., DR of 10, CUR of 20, and without a chemical modifier in the drift gas, as the CoV applied to the DMS was scanned from about +4 V to about +14 V.

As shown in FIG. 8A, the curve for the diastereomeric reaction products of methamphetamine exhibits CoV peaks at +7.0 V (corresponding to (S,S)-N-(trifluoroacetyl)prolyl methamphetamine ions) and +9.1 V ((R,S)-N-(trifluoroacetyl)prolyl methamphetamine ions). The ionograms of FIGS. 7A and 8A suggest that the peak at +9.1 V DC in sample A likely represents the transmission of (R,S)-N-(trifluoroacetyl)prolyl methamphetamine ions (and thus the presence of R-methamphetamine in the original racemic mixture), while the peak at +7.0 V for sample A represents the (S,S)-N-(trifluoroacetyl)prolyl methamphetamine ions from sample A.

This is further confirmed by the mass spectra of FIGS. 8B and 8C, which depict the m/z ratios of the fragmentation products of the ions transmitted by the DMS at the CoVs of +9.1 V (FIG. 8B) and +7.0 V (FIG. 8C) and generated by the 5500 QTRAP® MS system operated in EPI mode. With reference to FIG. 8B, ions of m/z 343 that were transmitted at DMS conditions of CoV=+9.1 V exhibit many of the same product ions as displayed in FIG. 8C. In FIG. 8C, it will be observed that the ions exhibiting a m/z of 343 Da that were transmitted at DMS conditions of CoV=+7.0 V fragmented to produce a unique fragment ion at m/z of 225 Da, possibly the result of the configuration of this diastereomer: (S,S)-N-(trifluoroacetyl)prolyl methamphetamine. Based on these data, it was confirmed that the ions transmitted by the DMS at CoV=+7.0 V represent the (S,S)-N-(trifluoroacetyl)prolyl methamphetamine diastereomer.

Example 3

Figure 9A:
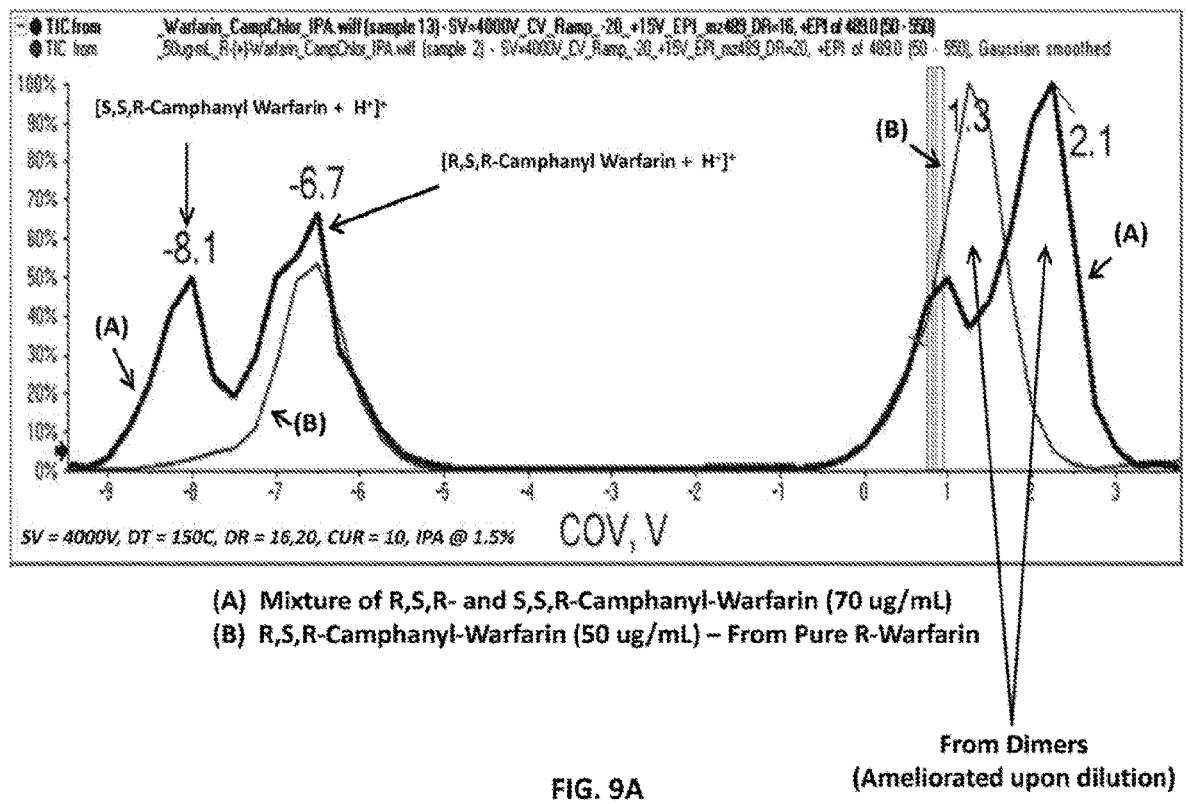
FIG. 9A illustrates an exemplary ionogram generated from samples containing a mixture of (R,S,R)- and (S,S,R)-camphanyl warfarin (curve A) and (R,S,R)-camphanyl warfarin (curve B).
Figure 9B:
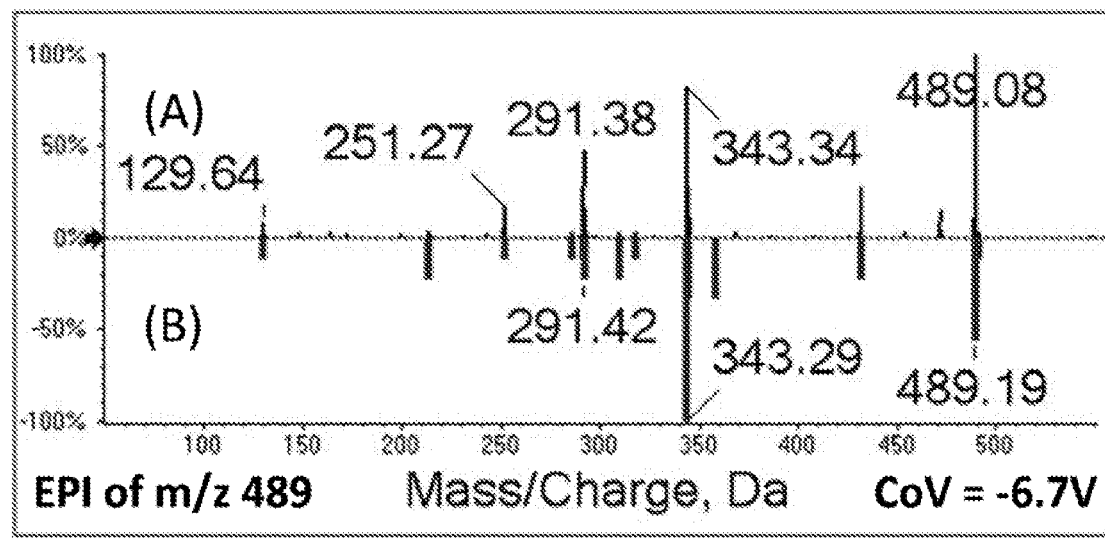
FIG. 9B illustrates an exemplary mass spectrum (EPI, enhanced product ion) for the ions transmitted from the DMS operating at CoV=−6.7 V, from samples containing a mixture of (R,S,R)- and (S,S,R)-camphanyl warfarin (top, curve A of FIG. 9A) and (R,S,R)-camphanyl warfarin (bottom, curve B of FIG. 9A).
Figure 9C:
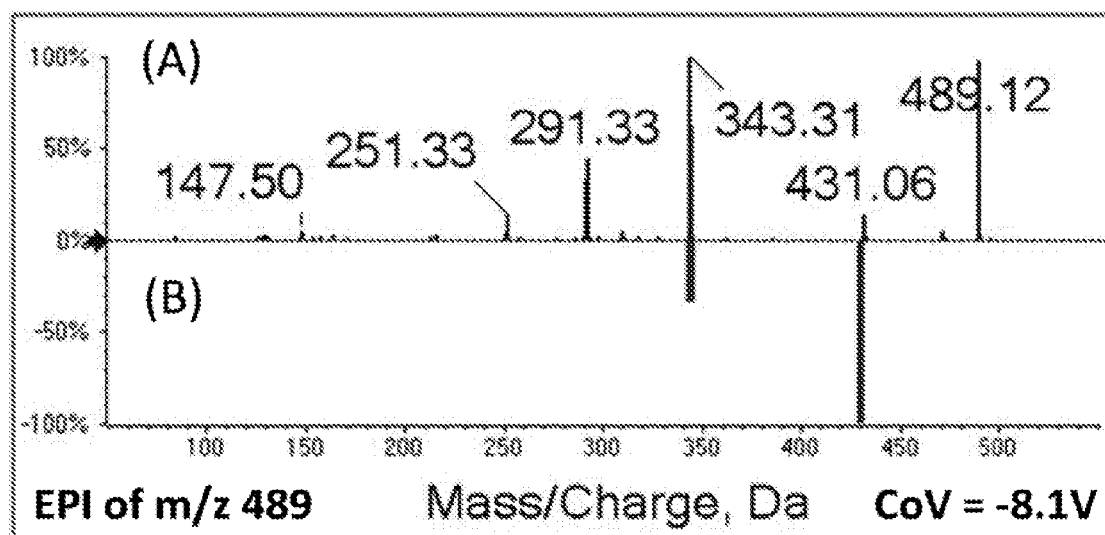
FIG. 9C illustrates an mass spectrum (EPI, enhanced product ion) for the ions transmitted from the DMS operating at CoV=−8.7 V, from samples containing a mixture of (R,S,R)- and (S,S,R)-camphanyl warfarin (top, curve A of FIG. 9A) and (R,S,R)-camphanyl warfarin (bottom, curve B of FIG. 9A).

With reference first to FIGS. 9A-C, exemplary data are depicted demonstrating the separation of the enantiomeric forms of warfarin using DMS. As discussed above, warfarin represents a chiral compound having two enantiomeric forms: R- and S-warfarin. Though conventional DMS methods and systems are generally unable to resolve these enantiomers such that the individual enantiomers can be confirmed and/or quantified, methods and systems in accordance with various aspects of the present teachings can allow for this determination by reacting a sample containing the enantiomers of R- and S-warfarin with a enantiomerically-pure 1S,4R-camphanic chloride, as discussed above with reference to FIG. 5. As shown in FIG. 9A, ionograms are shown for two samples of derivatized warfarin diastereomers. In sample A, the warfarin comprised a racemic mixture of R- and S-warfarin, each of which is reacted with 1S,4R-camphanic chloride so as to generate a sample containing 70 µg/mL of two diastereomeric forms: R,S,R-camphanyl warfarin and S,S,R-camphanyl warfarin. In sample B, the warfarin comprised a pure R-warfarin such that the reaction resulted in a single diastereomeric form in the sample at 50 µg/mL: R,S,R-camphanyl warfarin. The ionogram of FIG. 9A was generated by operating the differential mobility spectrometer (SelexION™, SCIEX, Concord, ON) with an SV of 4000V, DT of 150° C., DR of 16 psi (Curve A) and 20 psi (Curve B), CUR of 10 psi containing 1.5% (v/v) isopropanol, as the CoV applied to the DMS was scanned from about −10V to about +4V DC. The DMS was mounted on a 5500 QTRAP® system (SCIEX), with the total ion intensity (y-axis) reflecting the count of ions transmitted by the DMS at each CoV.

As shown in FIG. 9A, the curve for sample A containing the two diastereomers of camphanyl warfarin exhibits CoV peaks at −8.1 V and −6.7 V. The curve for sample B containing only one of the diastereomers of sample A (i.e., R,S,R-camphanyl warfarin) exhibited a single peak at −6.7 V. While there are additional peaks for curve A (e.g., at +2.1 V) and curve B (e.g., at +1.3 V), these peaks were likely due to dimerization of the diastereomers at the sample concentrations and were ameliorated when the samples were retested at a concentration of 700 ng/mL (not shown). The ionogram of FIG. 9A suggests that the peak at −6.7 V DC in sample A likely represents the transmission of R,S,R-camphanyl warfarin ions from sample A, while the peak at −8.1V for sample A represents the S,S,R-camphanyl warfarin ions since it does not align with a peak of curve B.

This is further confirmed by the mass spectra of FIGS. 9B and 9C, which depict the m/z ratios of the fragmentation products of the ions transmitted by the DMS at CoVs of −6.7 V (FIG. 9B) and −8.1 V (FIG. 9C) and generated by the 5500 QTRAP® MS system operated in EPI mode. With reference to FIG. 9B, ions of m/z 489 that were transmitted at DMS conditions of CoV=−6.7 V exhibit the same product ions for both sample A (top) and sample B (bottom). This confirms that the ions from sample A transmitted by the DMS at CoV=−6.7 V represent the S,S,R-camphanyl warfarin diastereomer form resulting from the S-warfarin enantiomer present in the sample. With reference to FIG. 9C, it will be observed that the ions of m/z 489 that were transmitted at DMS conditions of CoV=−8.1 V did not exhibit the same productions for both sample A (top) and sample B (bottom). However, it will be appreciated that the product ions for sample A (top) of FIG. 9C are similar to those product ions of FIG. 9B. This confirms that the ions from sample A transmitted by the DMS at CoV=−8.1 V represent the R,S,R-camphanyl warfarin diastereomer, and thus, the R-warfarin enantiomer present in the sample.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

The invention claimed is:

1. A method of analyzing a sample containing or suspected of containing at least one enantiomer of an enantiomeric isomer pair, comprising:
   a. reacting, if present, each enantiomer of an enantiomeric isomer pair with a derivatizing reagent so as to form diastereomers corresponding to each enantiomer of the enantiomeric pair, wherein each enantiomer of the enantiomeric isomer pair is covalently bound to the derivatizing reagent and wherein said derivatizing reagent is an enantiomerically-pure compound having at least one chiral center;
   b. ionizing said diastereomers so as to form ionized diastereomers; and
   c. transporting said ionized diastereomers through a differential mobility spectrometer to effect separation of said ionized diastereomers corresponding to each enantiomer of the enantiomeric pair.

2. The method of claim 1, wherein said reagent is an acyl halide.

3. The method of claim 2, where said reagent is one of S-(−)-N-(trifluoroacetyl)prolyl chloride and R-(−)-N-(trifluoroacetyl)-propyl chloride.

4. The method of claim 1, wherein said is reagent is one of 1R,4R-camphanic chloride, 1R,4S-camphanic chloride, 1S,4R-camphanic chloride, and 1S,4S-camphanic chloride.

5. The method of claim 1, wherein said reagent has only one chiral center.

6. The method of claim 1, wherein said reagent has two chiral centers.

7. The method of claim 1, wherein said enantiomers comprise at least one of a hydroxyl group and a primary amine.

8. The method of claim 7, wherein said step of reacting enantiomers comprises covalently bonding one or more of said hydroxyl group and primary amine to said derivatizing reagent.

9. The method of claim 1, wherein a compensation voltage and a separation voltage are applied to the differential mobility spectrometer so as to selectively transmit one of said ionized diastereomers.

10. The method of claim 9, further comprising scanning the compensation voltage while maintaining the separation voltage.

11. The method of claim 9, further comprising adjusting at least one of the compensation voltage and the separation voltage after a first duration so as to selectively transmit the other of said ionized diastereomers for a second duration.

12. The method of claim 1, further comprising adding a chemical modifier to a drift gas for transporting said ionized diastereomers through the differential mobility spectrometer.

13. The method of claim 12, wherein the chemical modifier is selected from the group consisting of water, methanol, isopropanol, acetonitrile, and acetone.

14. The method of claim 1, further comprising detecting the ionized diastereomers transported from the differential mobility spectrometer at a first combination of compensation voltage and separation voltage and at a second combination of compensation voltage and separation voltage applied to the differential mobility spectrometer, wherein the first combination is configured to optimize transmission of the ionized diastereomer corresponding to a first enantiomer of the enantiomeric pair and the second combination is configured to optimize transmission of the ionized diastereomer corresponding to a second enantiomer of the enantiomeric pair.

15. The method of claim 14, further comprising determining the relative abundance in the sample of the first and second enantiomers of the enantiomeric pair.

16. The method of claim 1, wherein the differential mobility spectrometer comprises High-Field Asymmetric Waveform Ion Mobility Spectrometry (FAIMS).

17. A method of analyzing a sample containing or suspected of containing at least one enantiomer of an enantiomeric isomer pair, comprising:
   transporting one or more diastereomers each of which is derived from a single enantiomer of the enantiomeric pair through a differential mobility spectrometer to effect separation of the one or more diastereomers, wherein the one or more diastereomers are formed by covalently bonding an enantiomerically-pure compound having at least one chiral center with each single enantiomer of the enantiomeric pair.

18. The method of claim 17, wherein the one or more diastereomers comprise a first diastereomer corresponding to a first enantiomer of the enantiomeric isomer pair and a second diastereomer corresponding to a second enantiomer of the enantiomeric pair, the method further comprising determining the relative abundance in the sample of the first enantiomer and the second enantiomer based on the relative abundance of the diastereomers following the differential mobility separation.

* * * * *